Figure 1:
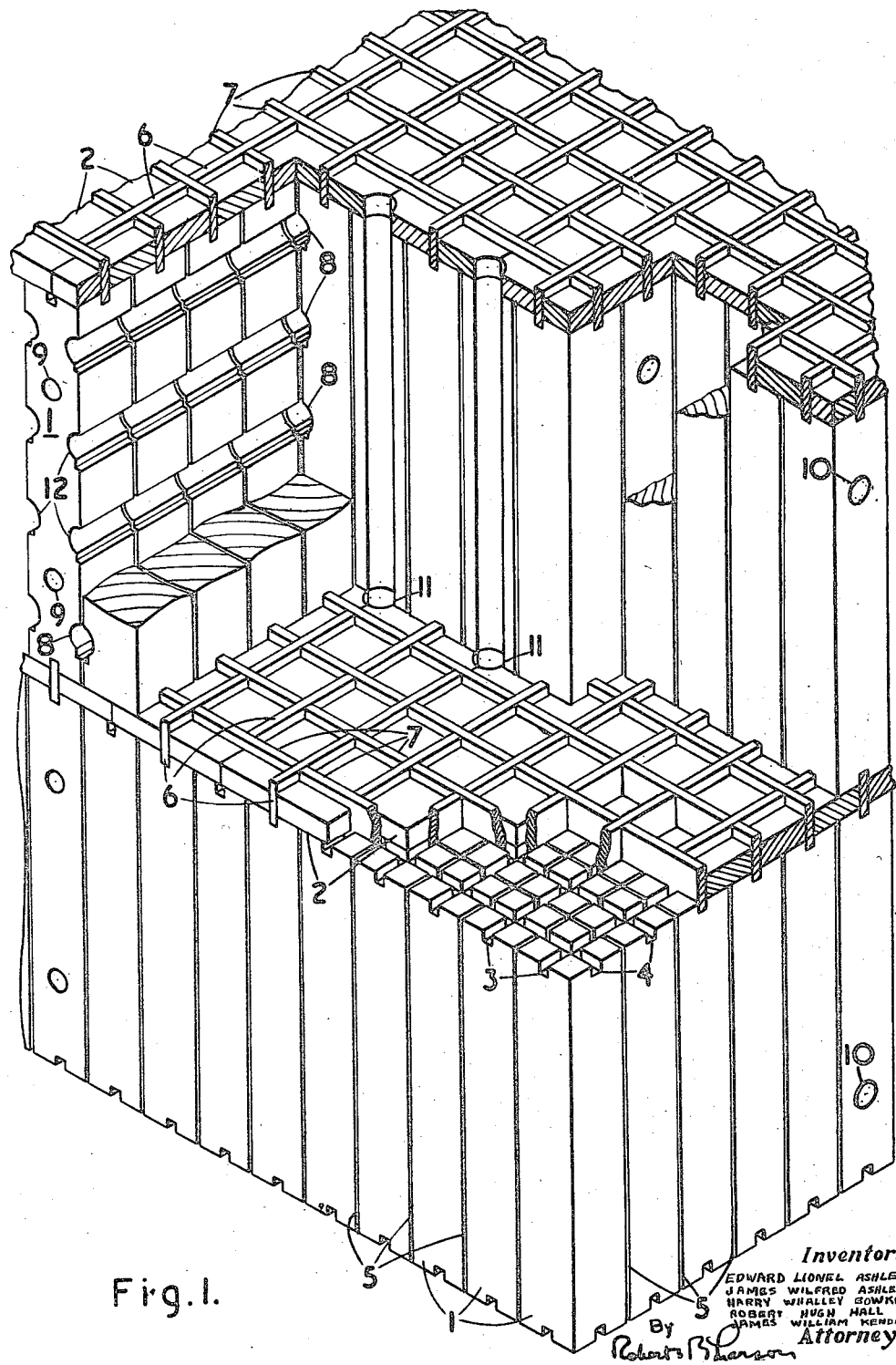

Feb. 3, 1959    E. L. ASHLEY ET AL    2,872,398
NEUTRON-IRRADIATED STRUCTURES
Filed March 7, 1950    3 Sheets-Sheet 3

EDWARD LIONEL ASHLEY
JAMES WILFRED ASHLEY
HARRY WHALLEY BOWKER
ROBERT HUGH HALL
JAMES WILLIAM KENDALL
Inventors
By
Roberts B Larson Attorney

United States Patent Office 2,872,398
Patented Feb. 3, 1959

2,872,398

NEUTRON-IRRADIATED STRUCTURES

Edward Lionel Ashley, James Wilfred Ashley, Harry Whalley Bowker, Robert Hugh Hall, and James William Kendall, Strand, London, England, assignors, by mesne assignments, to the United States of America as represented by the United States Atomic Energy Commission Application March 7, 1950, Serial No. 148,042

11 Claims. (Cl. 204—193.2)

This invention relates to neutron-irradiated structures such as are required in nuclear reactors and has for an object to provide a massive structure stable in a neutron field despite pronounced Wigner growth of the substance of the structure.

Wigner growth is the physical expansion or change of shape of a material exposed to a neutron flux. In massive structures of material such as graphite in which the Wigner effect is pronounced, the establishment of an intense neutron flux leads to swelling and expansion which introduce design difficulties in the erection and utilisation of the structure.

A characteristic of Wigner growth is that it tends to differ in different directions through the material. However, blocks of the material may be shaped with respect to the grain or texture so that the longitudinal growth in a uniform neutron field is the same for all blocks. If the length dimension of the block is chosen to coincide with the direction of minimum Wigner growth in the material, the longitudinal growth is also a minimum for the material.

In one aspect of the invention, strings of blocks, of similar Wigner growth longitudinally of the string, stretch respectively through the width, breadth and height of the structure and determine its overall dimensions. Each string locates along its own length the neighbouring strings transverse to it, so that changes in the width and thickness of the individual strings have little or no effect on the overall dimensions. Thus although the material is anisotropic in its Wigner growth, the structure has a linear expansion which is independent of direction. It expands uniformly in a uniform field and its volume expansion in a given field is determinable.

In the case of a material having only two-dimensional Wigner growth, the invention provides a structure the overall dimensions of which are independent of Wigner growth.

The structure of the invention in one form comprises a framework or skeleton of vertical columns and horizontal cross members pinned or otherwise jointed together so that each column and cross member locates along its own length the members transverse to it. The members, if they do not extend individually from one face of the structure to the opposite face, are butted or otherwise joined together in strings to make up the total length between the faces, the interposition of any transverse member in the make-up of this total length being avoided. Changes in lateral dimensions of the members then have no effect on the overall dimensions of the structure and it becomes possible to design the structure on the basis of a known Wigner growth effect independent of direction through the structure. The spaces in the framework or skeleton so formed are filled with packing blocks having clearances permitting their free growth. Alternatively the members of the skeleton or framework may be closely spaced, i. e. with clearances between them only sufficient to permit the lateral Wigner growth, so that a substantially solid mass is formed by the structural members themselves.

The invention will be further described with particular reference to graphite structures for uranium-graphite piles although it is also applicable to structures of other material in which the Wigner effect is pronounced, and to structures of graphite or such other material associated with a neutron source other than a uranium-graphite pile. It is applicable for example to a fissile-producing graphite thorium mass in which a neutron flux is set up by means of a fast fission reactor.

In a uranium-graphite pile arranged for the maintenance of a chain-fission reaction, there is required a large mass of graphite with channels through it for the introduction of the uranium serving as nuclear fuel and for the passage of a cooling fluid. Under the large and non-uniform neutron flux resulting from the nuclear reaction the graphite mass tends to become distorted due to the growth in dimensions known as the Wigner effect and this distortion may set a limit to the power level of operation since the shape of the mass and of the channels in it must be kept within operating limits.

When graphite is produced by extrusion or otherwise to have a pronounced grain, it is found that the Wigner growth is transverse to the grain, the growth along the grain being relatively small. The growth along the grain after prolonged exposure is in fact less than the initial thermal expansion, and may be negative. The graphite thus exhibits a two-dimensional Wigner growth.

The structure of the invention in one form comprises blocks in super-posed horizontal layers, the blocks of each layer being tied together with spaces between them and oriented to have horizontal Wigner growth. Preferably the ties are strips of material, the same as the blocks, with transverse Wigner growth, disposed horizontally along lines crossing at vertical axes of the blocks. The blocks are preferably rectangular with a larger or length dimension transverse to the directions of Wigner growth, and so are stood on end to provide for horizontal growth.

In the application of the invention in this form to a graphite structure, graphite blocks are arranged in layers one upon another with the graphite grain vertical so that the Wigner expansion is horizontal. Spaces for taking up the expansion are left between the blocks of each layer, and horizontal ties, in the form of graphite strips cut along the grain, are arranged to bridge the spaces. The blocks are preferably rectangular and of length along the grain equal to several times the width dimension; they are stood on end and the graphite strips extend between the layers in grooves cut in the end faces of the blocks.

Graphite structure for a uranium-graphite pile embodying the invention will now be described by way of example and with reference to the accompanying drawings the Figs. 1, 2 and 3 of which show different embodiments.

Figure 2:
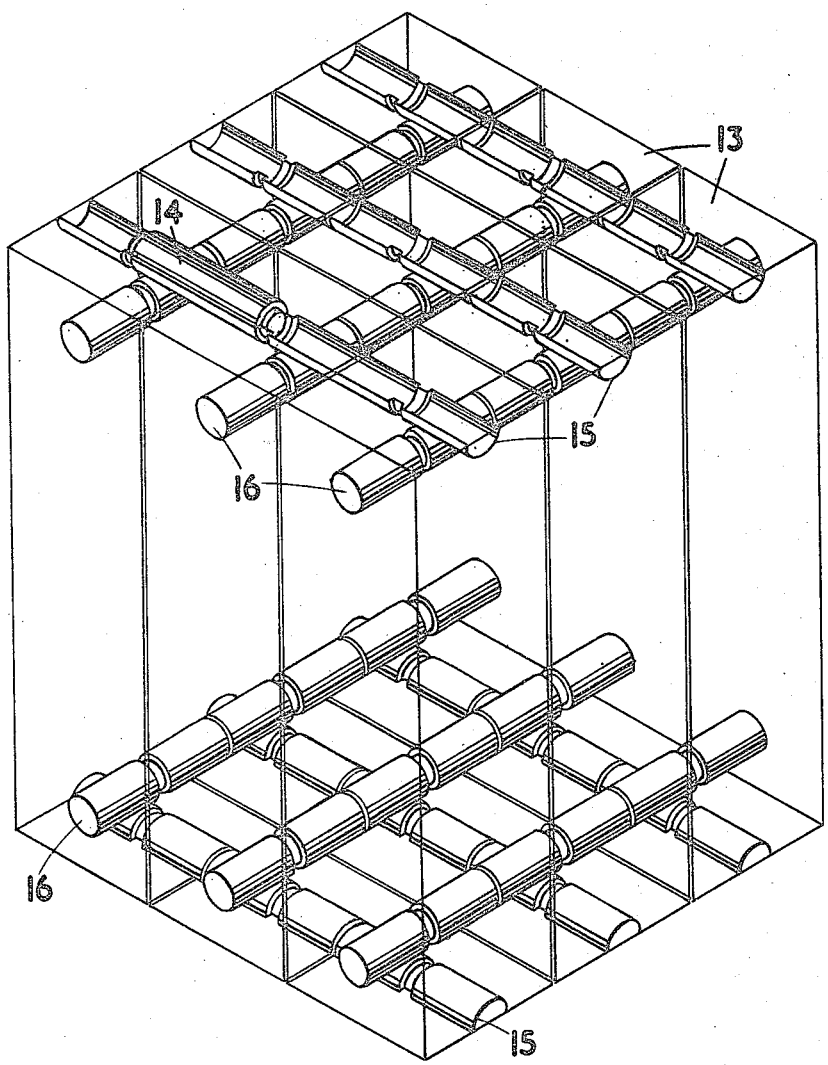

Referring to Fig. 1 the main components of the graphite structure are similar graphite blocks 1 of a width equal to the desired lattice spacing of the uranium and of a length approximately equal to a whole number of lattice spacings. In the structure illustrated the lengths of the blocks are somewhat less than four lattice spacings and packing blocks 2 are introduced as described in more detail hereinafter. The thickness of the block 1 is of the same order as the width and will be in the ensuing description taken as equal to the width.

Each of the blocks 1 is formed so that the grain of the graphite extends along its length; it is machined to a close tolerance; it has rectangular grooves 3, 4 cut normal to each other across each of its end faces.

The graphite structure comprises a series of horizontal layers of the blocks 1. To form each layer the blocks are stood vertically and side by side with narrow spaces 5 between them. Ties 6 and 7 of graphite, cut like the blocks 1, to have the graphite grain extending along the length of the tie, are laid in the end grooves 3, 4, appearing in the top surface of the layer. The ties are preferably of length equal to two block widths, each tie bridging three blocks and butting against ties normal to it. The next layer is then built up by stacking further blocks 1 vertically upon the respective blocks 1 of the preceding layer, the grooves in the further blocks fitting over the ties 6 and 7.

The upper blocks rest either directly on the lower ones, or, as shown, on packing blocks 2 interposed between the layers. The grooves 3 and 4 are cut deeply enough to permit vertical expansion of the ties 6 and 7.

Prior to assembly of the structure, additional holes and grooves are formed in the graphite blocks as necessary to serve as fuel carrying cooling channels 8, as holes 9 for the insertion of thorium and other material ot be irradiated, as holes 10 for control rods and as holes 11 for shut off rods. Although in the drawing, only two columns of fuel channels 8 are shown, such channels will normally be distributed across the whole section of the structure except for peripheral portions which are to serve only for neutron reflection.

For the fuel channels 8, grooves 12 are cut across opposite sides of the blocks 1 so that in the assembled structure the cooling channels are circular with flat keyways and are spaced one block-width apart.

In the structure illustrated, the blocks 1 have a length somewhat less than four lattice spacings. Flat rectangular packing blocks 2, cross-grained so that the Wigner growth is along their larger dimensions, are inserted in the rectangular spaces between the ties; their thickness is chosen to secure the required common lattice spacing between the upper fuel channels of the main blocks 1 of one layer and the lower fuel channels of the main blocks 1 of the next layer.

The structure assembled in the way described with reference to the drawing exhibits negligible change in overall dimensions due to Wigner growth. The overall height is the sum of a number of block lengths and packing block thicknesses, all of which are in the direction of the graphite grain and so of small growth. Each of the blocks 1 is held to a fixed position in the horizontal plane by the ties 6, 7 and is free to expand laterally. The thickness of the spacings between the blocks is chosen to provide ample room for block expansion at the local neutron flux densities to be developed. At flux densities of the order developed in a plutonium-producing pile having aluminum-sheathed uranium rods as fuel, cooled by air pumped through at one or two atmospheres mean pressure, a spacing between the blocks of the order of a quarter inch is appropriate in the central regions of the structure; the spacing between the outer blocks and particularly between the blocks of the bottom and top layers may be less, for example, of the order of a tenth inch.

During the working life of the pile the spaces between the blocks become smaller.

The ties 6, 7 exhibit negligible longitudinal Wigner growth and, butting closely against each other, form a rigid locating lattice for maintaining the blocks 1 in fixed positions in the horizontal plane. The growth in thickness of the ties 6, 7 is similar to the lateral growth of the blocks and hence equal to the increase in width of the grooves. Consequently a normal fitting tolerance between the tie thickness and the groove width may be adopted, and little or no horizontal play between the blocks and the ties results, although each block is free to expand laterally. Change in depth of the ties as a result of Wigner growth is accommodated by making the depths of the grooves sufficient to leave a clearance into which the ties can expand.

The packing blocks are cut to have clearances in the lattice of ties to accommodate their horizontal growth.

The holes 10, 11 for control rods and shut-off rods and the holes 9 for the introduction of thorium and other material to be irradiated remain straight and of substantially unchanged dimensions during the working life of the structure, because they pass through the axes of the blocks. The fuel channels 8 remain straight but suffer a small contraction in width which is greatest in the central regions of the structure. The effect of this change on the rate of heat removal can be compensated by normal control of the coolant pressure. The coolant velocity gradient resulting from the non-uniformity of contraction is advantageous in that it tends to reduce the fuel temperature gradient through the pile.

Butting of the ties 6 and 7 as described and shown introduces Wigner growth in the length of each string of ties because each string-length includes several thicknesses of the ties crossing it. This growth can be made small by employing thin ties. It can be further reduced by adopting a tie lattice of larger mesh with subsidiary lattices in each mesh. If such expedients are inadequate for a particular size of structure and neutron field intensity, halved joints instead of butt joints may be used, so that each string consists solely of ties in end-to-end contact and consequently exhibits negligible Wigner extension.

Alternatively, instead of ties at the ends of the blocks 1, plugs or inserts such as dowel pins may be set in the blocks to hold their axes in fixed relation to each other. A dowelled structure of graphite blocks 13 (drawn as though transparent) and dowels 14 in grooves 15 and holes 16 is shown in Fig. 2.

Figure 3:
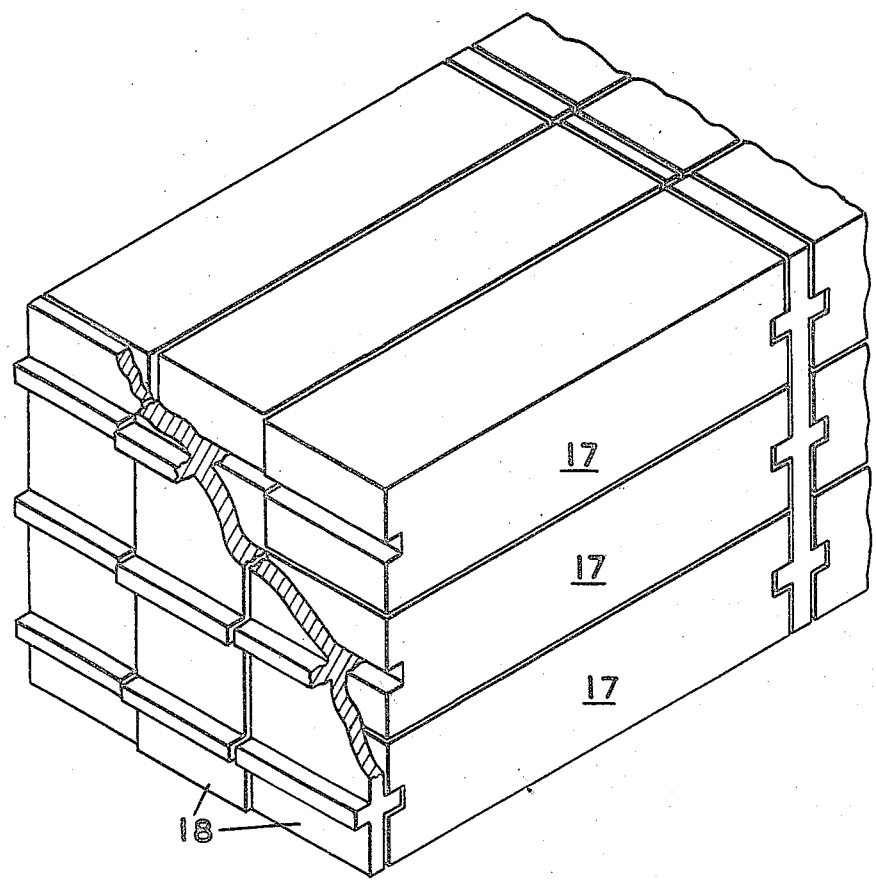

Another graphite structure embodying the invention is shown in Fig. 3 and comprises elongated blocks 17 stretching horizontally and being individually supported on racks provided by vertical columns 18, the spacing between the blocks being sufficient to allow free lateral growth. The vertical columns are themselves held in fixed spaced relation by the horizontal blocks. Further horizontal spacers transverse to the blocks may be provided. The several members are all cut to have lateral Wigner growth ineffective upon the overall dimensions of the structure.

We claim:

1. A structure, for irradiation in a nuclear reactor, made predominantly of moderating material having the property of substantial Wigner growth in one plane only, comprising a stack of prismatic blocks of said material and each having a major axis in the direction of negligible Wigner growth, said major axes being parallel, and means for interconnecting said blocks to maintain said blocks spaced from each other in directions transverse to said major axes so that space between said blocks remains for the Wigner growth of said blocks under irradiation.

2. A structure, for irradiation in a nuclear reactor, according to claim 1 wherein said blocks are located by a box grid positioned in slots at the ends of said blocks, said slots being cut to intersect at said major axes.

3. A structure according to claim 1 wherein said blocks are located by pins joining said blocks and having longitudinal axes intersecting said major axes of the blocks.

4. A graphite moderator structure for a nuclear reactor, comprising stacks of uniform right parallelepiped blocks of graphite positioned in layers extending in the direction of the length of said blocks, said blocks having minimum Wigner growth properties in the direction of the lengths of said blocks and means spacing said blocks apart in a direction transverse of the lengths of said blocks.

5. A graphite moderator structure for a nuclear reactor according to claim 4 wherein said blocks are shaped to define channels along and normal through said lengthwise axes.

6. A graphite moderated structure for a nuclear reactor according to claim 4 defining channels parallel to and normal to said lengthwise axes.

7. A graphite moderator structure for a nuclear reactor according to claim 4 wherein said last named means comprises slat-like ties disposed in slots cut in said blocks at the mating faces of adjacent layers of blocks, said slots intersecting at the longitudinal axis of said blocks, and said ties having minimum Wigner growth along their length.

8. A graphite structure stable in a neutron flux comprising, columns of graphite blocks, each of said blocks having minimum Wigner growth along one axis thereof, and having the axes of minimum Wigner growth disposed parallel to each other, said blocks being spaced from each other in directions transverse to said parallel axes thus permitting Wigner growth in the transverse direction, and transverse ties interconnecting said columns to maintain said columns in fixed position relative to each other in the transverse direction.

9. A graphite structure according to claim 8 wherein said ties are graphite strips disposed along lines crossing at the axes of the columns.

10. A graphite structure according to claim 8 said blocks being machined from extruded graphite to have a rectangular shape, the larger dimension lying along the grain, said blocks being stood on end to form said columns.

11. A graphite structure according to claim 8, said blocks being cut with their length along the grain in the graphite and being stood on end, said ties being constituted by graphite strips traversing grooves cut in the end faces of said blocks.

References Cited in the file of this patent

FOREIGN PATENTS 233,011     Switzerland _____ Oct. 2, 1944

OTHER REFERENCES

Modern Refractory Practice, by Harbison-Walker Refractories Co., Pittsburgh, Pa., 2nd ed., 1937, pp. 165–170.

Smyth: A General Account of the Development of Methods of Using Atomic Energy for Military Purposes Under the Auspices of the U. S. Government, pp. 40–42, 68–71, 82–85, 108, 177, 1945. Superintendent of Documents, Washington 25, D. C.

Smyth: Atomic Energy for Military Purposes, p. 103, par. 103; p. 22, par. 2.7, August 1945. Copy from Supt. of Doc., Wash., D. C.

Lapp and Andrews: "Nuclear Radiation Physics," pp. 325, 393, Prentice-Hall (1948).